US009672505B2

(12) United States Patent
Naccache et al.

(10) Patent No.: US 9,672,505 B2
(45) Date of Patent: Jun. 6, 2017

(54) METHOD FOR VERIFYING THE AUTHENTICITY OF A TERMINAL, CORRESPONDING DEVICE AND PROGRAM

(71) Applicant: Compagnie Industrielle et Financiere d'Ingenierie "Ingenico", Paris (FR)

(72) Inventors: David Naccache, Paris (FR); Alain Soubirane, Bourg-les-Valence (FR); Laurent Mayer, Courdimanche (FR); Nora Dabbous, Suresnes (FR); Pierre Quentin, Enghien-les-Bains (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/675,049

(22) Filed: Mar. 31, 2015

(65) Prior Publication Data

US 2015/0278792 A1  Oct. 1, 2015

(30) Foreign Application Priority Data

Mar. 31, 2014  (FR) ...................................... 14 52829

(51) Int. Cl.
*G06K 7/00*  (2006.01)
*G06Q 20/20*  (2012.01)
(Continued)

(52) U.S. Cl.
CPC ....... *G06Q 20/206* (2013.01); *G06Q 20/3278* (2013.01); *G06Q 20/40* (2013.01); *G06Q 30/018* (2013.01)

(58) Field of Classification Search
USPC .................. 235/375, 379, 380; 705/5, 35–45
See application file for complete search history.

(56) References Cited

U.S. PATENT DOCUMENTS 8,195,576 B1   6/2012  Grigg et al.
8,538,863 B1   9/2013  Saunders
(Continued)

FOREIGN PATENT DOCUMENTS

WO      03081832 A2   10/2003
WO   2012037479 A1    3/2012

OTHER PUBLICATIONS

French Search Report and Written Opinion dated Dec. 17, 2014 for corresponding French Application No. 1452829, filed Mar. 31, 2014.
(Continued)

*Primary Examiner* — Matthew Mikels
(74) *Attorney, Agent, or Firm* — David D. Brush; Westman, Champlin & Koehler, P.A.

(57) ABSTRACT

A method is provided for verifying an authenticity of a payment terminal, implemented by using of a device for verifying authenticity. The method includes: transmitting to the payment terminal a request for obtaining a piece of identification data by using of a contactless communications interface; receiving a response, through said contactless communications interface and coming from the payment terminal, to said request for obtaining a piece of identification data; comparing a field of said response with at least one piece of pre-recorded identification data; when the field includes a piece of identification data identical to said at least one piece of pre-recorded identification data, for issuing an assertion of authenticity of said payment terminal; when the field comprises a piece of identification data different from said at least one piece of pre-recorded identification data, issuing a piece of information on absence of authentication of the payment terminal.

16 Claims, 3 Drawing Sheets

(51) Int. Cl.
*G06Q 20/40* (2012.01)
*G06Q 20/32* (2012.01)
*G06Q 30/00* (2012.01)

(56) References Cited

U.S. PATENT DOCUMENTS

| | | | |
|---|---|---|---|
| 2010/0274677 A1* | 10/2010 | Florek | G06Q 20/10 705/16 |
| 2011/0295707 A1* | 12/2011 | Gui | G06Q 20/206 705/18 |
| 2013/0040563 A1* | 2/2013 | Kim | G06Q 20/3572 455/41.1 |
| 2013/0124346 A1* | 5/2013 | Baldwin | G06Q 20/322 705/16 |
| 2015/0161643 A1* | 6/2015 | Randell | G06Q 30/0225 705/14.26 |

OTHER PUBLICATIONS

English translation of the French Written Opinion dated Dec. 17, 2014 for corresponding French Application No. 1452829, filed Mar. 31, 2014.

\* cited by examiner

METHOD FOR VERIFYING THE AUTHENTICITY OF A TERMINAL, CORRESPONDING DEVICE AND PROGRAM

1. FIELD OF THE PRESENT DISCLOSURE

The present disclosure relates to the field of payment terminals. The technique relates more particularly to the securing of payment terminals.

2. PRIOR ART

Payment terminals undergo numerous attempted attacks. Indeed, by the nature of the information that it contains and the sensitivity of the data that it processes, a payment terminal is an object of great value to malicious individuals. There is a certain type of fraud becoming widespread in which a valid payment terminal is replaced by a counterfeit payment terminal. The valid payment terminal is substituted in a store and immediately replaced by a payment terminal that has an appearance of validity but is actually either modified, for example to read and copy customers' bankcard data or to be completely emptied of its contents and replaced by a simple device for reading and recording the customer's data. The unwary merchant can easily be duped and will not realize the existence of the fraud for several days.

One way to resolve this problem of replacement is to apply a mark to the terminal. Such a marking enables the merchant to realize that his terminal has been substituted. This technique is efficient when the fraudulent person is not himself capable of reproducing this marking. This technique is therefore limited by the fraudulent individual's capacity to reproduce the marking. Now, for a marking to be efficient, it must be visible. If this marking is visible, it is also visible to the fraudulent individual who can therefore easily reproduce it. Thus, this simple solution for applying a marking is actually not really efficient.

Another way to resolve this problem is to have only wired payment terminals, i.e. payment terminals that are physically connected to a cash register for example. This solution is of course efficient but is actually ill-suited to current practice which offers high mobility to merchants and customers. Nonetheless, this technique is used for example in big stores and certain types of shops.

The existing techniques are nevertheless limited because it is necessary to prevent fraud being carried out in smaller-sized companies. There is therefore need to provide a technique that enables the merchant to detect fraud carried out by replacement of the terminal and prevents the negative effects of such fraud.

3. SUMMARY

An exemplary aspect of the present disclosure relates to a method for verifying an authenticity of a payment terminal, implemented by means of a device for verifying authenticity. According to the proposed technique, such a method comprises:
  a step of transmission, to the payment terminal, of a request for obtaining a piece of identification data by means of a contactless communications interface;
  a step for receiving a response through said contactless communications interface and coming from the payment terminal, to said request for obtaining a piece of identification data;
  a step for comparing a field of said response with at least one piece of pre-recorded identification data;
  when the field comprises a piece of identification data identical to said at least one piece of pre-recorded identification data, a step for issuing an assertion of authenticity of said payment terminal;
  when the field comprises a piece of identification data different from said at least one piece of pre-recorded identification data, a step for issuing a piece of information on absence of authentication of the payment terminal.

Thus, the proposed technique prevents the replacing of an authentic payment terminal by a fraudulent payment terminal. Indeed, the contactless communications interface makes sure that it will be very difficult for the fraudulent individual to obtain a piece of information capable of being reproduced. Depending on the embodiments, the transmission of the assertion of authenticity or of information on absence of authenticity can be either a display of a message on a screen or the implementation of a sound alarm or the transmission of a message to a server of a communications network or a combination of means. The advantage lies in the way in which the merchant will be informed according to a given situation.

According to one particular characteristic, said contactless communications interface is an NFC interface. Thus, the proposed technique drastically limits the signals transmitted in order to carry out the authentication of the payment terminals, thus greatly reducing the possibilities of these signals being hacked by a fraudulent individual. Accessorily, the transmission frequency of the signal sent to the NFC interface from the payment terminal depends on the quantity of plastic material that the signal must pass through. The power and the frequency are therefore a compromise between the need to obtain a response from the NFC interface of the payment terminal and the desire not to broadcast a signal over an excessively great range.

According to one particular embodiment, when no response is received, said step for transmitting a request for obtaining a piece of identification data is implemented iteratively for a predetermined period before the issuing of a piece of information on absence of authentication of the payment terminal.

According to one particular embodiment, said step for comparing comprises:
  a step for decrypting the response delivering a decrypted response;
  a step for obtaining, within a data structure, at least one piece of identification data associated with said payment terminal, delivering said at least one piece of pre-recorded identification data.

Thus, the proposed technique makes it possible to have available a terminal for verifying authenticity which can be used to carry out a verification of several payment terminals.

According to one particular embodiment, said piece of identification data furthermore comprises at least one component variable in time and this component variable in time is derived from a reference time computed according to said terminal for verifying authenticity. Thus, it is possible, even when the payment terminal is compromised, to have available a means for verifying its authenticity.

According to one particular embodiment, said method comprises:
  a step for obtaining a reference time;
  a step for computing a component that is variable in time as a function of this reference time.

Thus, a compromised payment terminal that tries to imitate the behavior of an original terminal would be incapable of reproducing the component variable in time. This component is either computed by the terminal for verifying authenticity or by a remote server to which the verification terminal makes a request by means of a request/response type exchange.

In at least one embodiment, the present disclosure also relates to a device for verifying an authenticity of a payment terminal, characterized in that it comprises:
- means for transmitting, to the payment terminal, a request for obtaining a piece of identification data by means of a contactless communications interface;
- means for receiving, through said contactless communications interface, and from the payment terminal, a response to said request for obtaining a piece of identification data;
- means for comparing a field of said response with at least one piece of pre-recorded identification data;
- means for issuing an assertion of authenticity of said payment terminal;
- means for issuing a piece of information on absence of authentication of the payment terminal.

In another embodiment, the proposed technique relates to a communications terminal. Such a communications terminal, for example of the Smartphone type, comprises means of contactless communication (for example of the NFC type), for the transmission and reception of data from contactless tags or from other terminals comprising contactless communications interfaces. These means are driven by a validity check module. Such a validity check module is used in conjunction with processing and communications means of the communications terminal to transmit a request for obtaining a piece of identification data, receive a response to said request for obtaining, compare this response with pre-recorded identification data and issue an assertion of authenticity when these pieces of received data comply with pre-recorded data.

In at least one embodiment, the present disclosure also relates to a payment terminal of the type comprising a display device, an information entry keypad, means for reading data coming from at least one payment device and means of connection to at least one communications network, this terminal being characterized in that it furthermore comprises means for the storage, within a specific memory zone, of at least one piece of data representing an identification of said terminal and means for receiving a request for obtaining said piece of data representing an identification of said terminal and means for transmitting said piece of data representing an identification of said terminal.

In at least one complementary embodiment, the payment terminal presented here above also comprises a device for verifying an authenticity.

Thus, two payment terminals of a same merchant can be used to verify each other's authenticity. In another embodiment, the proposed technique also relates to a payment terminal. Such a payment terminal comprises, in addition to the usual elements, at least one marking taking the form of a piece of identification data inserted into a tag. This tag is itself introduced into the terminal, for example on an electronic component soldered to a mother board of the terminal or else again in the plastic casing itself (in this case, the tag is inserted into the casing when the casing is created).

According to a an exemplary mode of implementation, the different steps of the methods are implemented by one or more software programs or computer programs comprising software instructions to be executed by a data processor of a relay module according to the present disclosure and designed to command the execution of the different steps of the methods.

As a consequence, the present disclosure is also aimed at providing a program, capable of being executed by a computer or by a data processor, this program comprising instructions to command the execution of the steps of a method as mentioned here above.

This program can also use any programming language whatsoever and can take the form of a source code, an object code, or a code that is intermediate between source code and object code, for example in a partially compiled form or in any other desirable form whatsoever.

The present disclosure also relates to an information carrier readable by a data processor and comprising instructions of a program as mentioned here above.

The information carrier can be any entity or device whatsoever capable of storing the program. For example, the carrier can comprise a means of storage, such as a ROM, for example a CD ROM, or a microelectronic circuit ROM or again a means of magnetic recording, for example a floppy disk or a hard disk drive.

Moreover, the information carrier can be a transmissible carrier such as an electrical or optical signal that can be conveyed by an electrical or optical cable, by radio or by other means. The program according to the present disclosure can especially be uploaded to an Internet type network.

As an alternative, the information carrier can be an integrated circuit into which the program is incorporated, the circuit being adapted to executing or being used for the execution of the method in question.

According to one embodiment, the present disclosure is implemented by means of software and/or hardware components. In this respect, the term "module" can correspond in this document equally well to a software component as to a hardware component or to a set of hardware and software components.

A software component corresponds to one or more computer programs or to several sub-programs of a program or more generally to any element of a program or a software program capable of implementing a function or a set of functions according to what is described here below for the concerned module. Such a software component is executed by a data processor of a physical entity (terminal, server, gateway, router, etc) and is capable of accessing the hardware resources of this physical entity (memories, recording carriers, communications buses, input/output electronic boards, user interfaces, etc).

Similarly, a hardware component corresponds to any element of a hardware unit capable of implementing a function or a set of functions according to what is described here below for the concerned module. It can be a programmable hardware component or with an integrated processor for the execution of software, for example an integrated circuit board, a smart card, a memory card, an electronic card for executing firmware, etc.

Each component of the previously described system naturally implements its own software modules.

The different embodiments described here above can be combined with each other to implement the one or more embodiments of the present disclosure.

4. DRAWINGS

Other features and advantages of the invention shall appear more clearly from the following description of an embodiment, given by way of a simple, illustratory and non-exhaustive example and from the appended figures, of which.

5. DESCRIPTION

5.1. Reminder of the Principle

Figure 1:
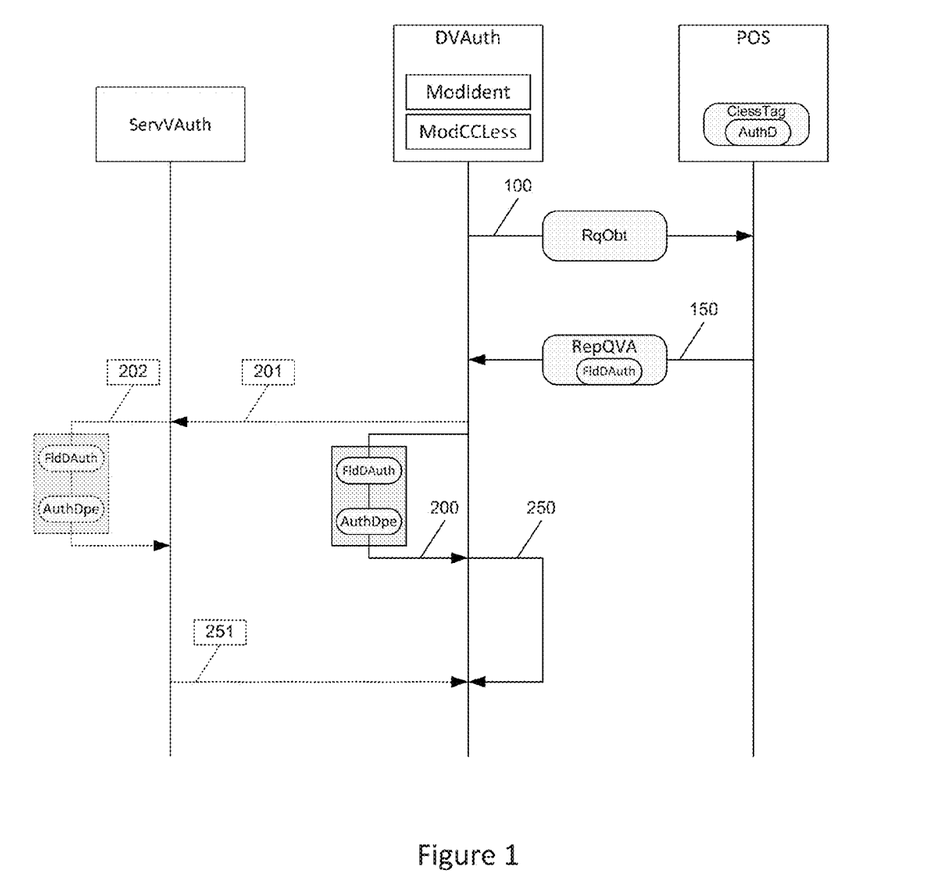
FIG. 1 is a block diagram of the proposed technique.
Figure 2:
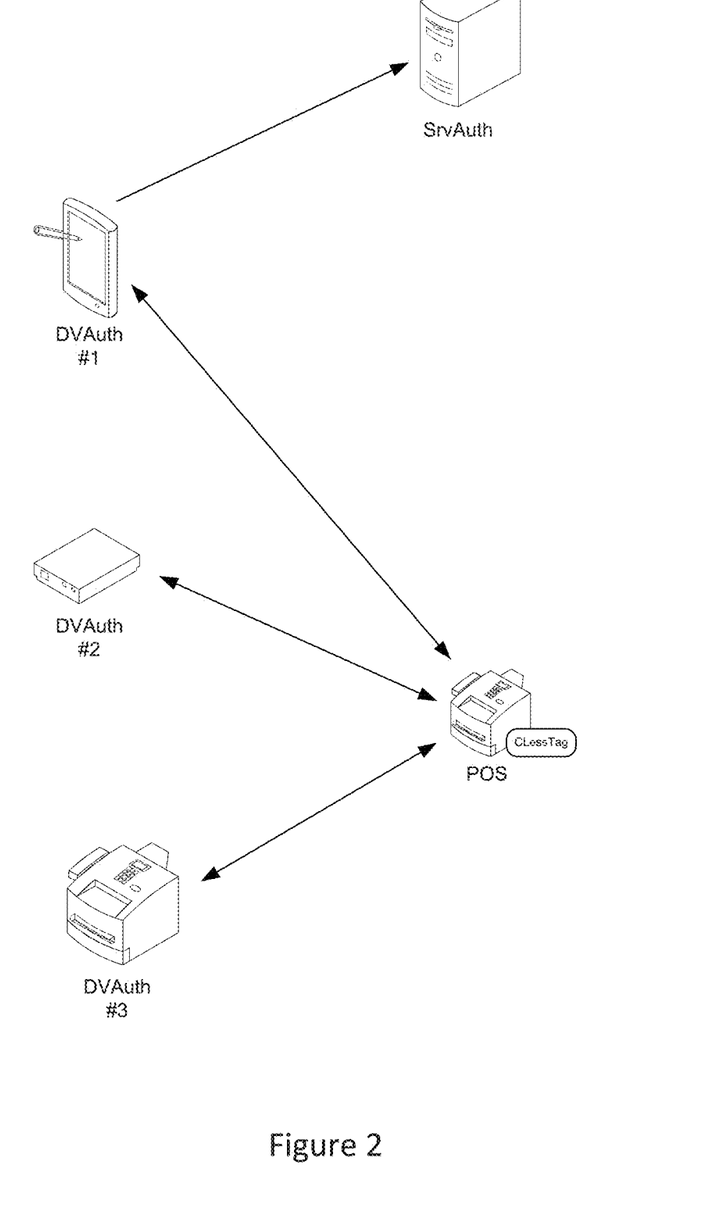
FIG. 2 presents a system in which the proposed technique can be implemented.

The general principle of an exemplary aspect of the present disclosure, described with reference to FIGS. 1 and 2, consists in providing the payment terminal (POS) with a piece of identification data (AuthD) that can be verified by the authenticity verification device (DVAuth) (for example a mobile communications terminal (DVAuth#1), a recharging cradle (DVAuth#2) or again another payment terminal ((DVAuth#3), that is twinned or paired with the payment terminal (POS)).

This piece of identification data is inserted into the payment terminal (POS) in order to produce a marking. This marking, which is invisible, cannot be reproduced by a fraudulent individual. This marking also makes it possible to ensure the authenticity of the payment terminal (POS).

The piece of identification data (AuthD) can be fixed data (for example representing a serial number) or variable data (for example a one-time use password generated randomly according to a predetermined method of generation). The identification data is inserted for example into a contactless tag. This contactless tag (CLessTag) can thus be interrogated by an authenticity verification terminal, such as a communications terminal, in order to verify the authenticity of the payment terminal (POS). In one particular embodiment, this contactless tag (CLessTag) is inserted directly into the plastic material of the casing of the payment terminal, for example during the manufacture of this casing. It can be a passive tag (this is the case for example of a piece of identification data (AuthD) representing a serial number of the payment terminal (POS)) or a semi-active tag (also called a BAP or battery-assisted passive tag) which can be used for example when the piece of identification data (AuthD) is upgraded in time (variable identification data).

In another embodiment, the payment terminal (POS) comprises a contactless communications module (ModCLess) and an identification module (ModIdent). This identification module (ModIdent) comprises a secured memory zone in which the piece of identification data (AuthD) of the payment terminal is registered. In this example, there is no contactless tag (CLessTag) proper, but when it receives a request for obtaining a piece of identification data (AuthD), the terminal behaves as if it contained a contactless tag (CLessTag).

The verification of authenticity of the payment terminal (POS) comprises the following steps which are for example implemented by means of another authenticity verification device (DVAuth) in the merchant's possession:

- a step for transmitting (100), to the payment terminal (POS), a request for obtaining (RqObt) a piece of identification data (AuthD); this request is transmitted by the authenticity verification device (DVAuth).
- a step for receiving (150), from the payment terminal (POS), a response (RepQVA) to said request for obtaining a piece of identification data (AuthD); this is typically the response of the tag (CLessTag) or of the payment terminal (POS) itself (which behaves as a tag), when the terminal is authentic, this response comprises the piece of identification data (AuthD) of the terminal, for example under the EPC-96 standard, in a field (FldDAuth).
- a step for comparing (200) a field (FldDAuth) of said response (RepQVA), which comprises the identification data when the terminal is authentic, with at least one piece of identification data (AuthDpe) preliminarily recorded or preliminarily known; this comparison can be made by means of the authenticity verification module proper to the communications terminal; as explained earlier, this module can be a dedicated hardware module or a software module; this comparison can be done (201, 202) by means of an authenticity verification server (ServVAuth) to which the authenticity verification terminal is connected (this avoids any compromising of the verification terminal);
- when the field (FldDAuth) comprises a piece of identification data identical to said at least one last piece of pre-recorded identity data (AuthDpe), a step for issuing (250) an assertion of authenticity of said payment terminal (POS); this step can also be implemented by the server (251);
- when the field (FldDAuth) comprises a piece of identification data different from said at least one piece of pre-recorded identification data (AuthDpe), a step for issuing (250) a piece of information on absence of authentication of the payment terminal (POS); this step can also be implemented by the server (251).

Typically, the authenticity verification device (DVAuth) is a mobile communications terminal comprising a module (software or hardware) for verifying authenticity (ModIdent).

Naturally, when the transmission of the request for obtaining a piece of identification data (AuthD) receives no response (i.e. the terminal does not respond to the signal transmitted by the communications terminal), the last step of the method is also implemented (the terminal is then considered to be corrupted and it is not authentic).

Complementarily, in at least one embodiment, when the payment terminal (POS) does not respond to the first transmission of the request for obtaining a piece of identification data (AuthD), the steps for transmitting and receiving are performed several times before concluding that there is an absence of authenticity of the terminal.

In another embodiment, another verification device can be used instead of a mobile communications terminal. This can be, for example, the cradle on which the terminal is placed when it is being charged. Such a cradle can be equipped with a module for verifying authenticity as described here above and a contactless (NFC or near field communication) transmission/reception interface. In this case, rather than activating an application at his communications terminal, the merchant presses a button on the charging cradle: the charging cradle then carries out the same operations as those described here above. In this embodiment, the issuing of the assertion lights up, for example, a green-colored LED while the absence of authenticity of the payment terminal (POS) causes a red-colored LED to get lit up.

Complementarily, in this embodiment, a temporal regulation module is also present within the recharging cradle. This temporal regulation module is coupled with the module for verifying the authenticity of the terminal. More particularly, the temporal regulation module comprises a memory zone automatically incremented after an operation of verification of the authenticity of the terminal. More particularly again, the temporal regulation module comprises a secured memory zone within which, for an identity of a payment terminal (POS), a temporal value is regularly incremented. In this embodiment, when the temporal value reaches a determined ceiling, the temporal regulation module sends the authenticity verification module an instruction for verifying the authenticity of the terminal. In this embodiment, the recharging cradle therefore waits for the payment terminal (POS) to be placed on the cradle to carry out a verification of authenticity (without intervention by the user). In the event of authenticity, the assertion of authenticity is issued (according to the embodiment chosen for this issuing). In the event of non-verification, a warning is sent to the merchant.

As an alternative, this method of temporal regulation can also be implemented within the user's communications terminal or else another payment terminal. Indeed, the contactless communications standard can be implemented at a distance of several meters from the payment terminal (POS). This means that it is quite possible (and envisaged) to see to it that the temporal regulation module implemented in software form acts on its own to verify the authenticity of the payment terminal (POS) in order to relieve the merchant of this obligation.

The transmission of the warning of non-authenticity to the merchant can also be done in several different ways, each of them having advantages. In a first embodiment, this assertion is transmitted to a processor for display (as can be envisaged in the user's communications terminal). This ensures a certain degree of discretion of transmission. In another embodiment, the absence of assertion can activate an alarm (visual or sound alarm) on the terminal in charge of verification (for example the user's communications terminal on the recharging cradle): this makes sure that the merchant will be immediately warned of the fraud. In yet another embodiment, the insertion (or alarm) is transmitted through a communications network to a server for managing fleets of payment terminals. This transmission can be done by the merchant's communications terminal or by a cash register to which the recharging cradle is connected)

Besides, in at least one other embodiment, the method for verifying authenticity can be implemented by another payment terminal (POS) belonging to the merchant. Indeed, it is frequent (especially in shopping areas or in fairly large stores) for several payment terminals to be used in conjunction. In this case, in order to limit the costs of production, the payment terminals can comprise both a piece of identification data (AuthD) and the means needed to obtain a piece of identification data (AuthD) from another payment terminal (POS). Thus, in this example, the fraudulent person must substitute and replace all of the merchant's payment terminals to carry out the fraudulent act.

5.2. Description of a First Complementary Embodiment

In this embodiment, it is assumed that the payment terminal (POS) comprises a passive NFC type tag comprising a piece of data representing the serial number of the terminal. More particularly, the piece of data representing the serial number of the terminal is derived from an encryption of the serial number of the payment terminal (POS). The encryption is done by means of a pair of asymmetrical encryption keys. The tag therefore comprises an encrypted version, of the serial number. This tag is molded at the same time as an element of the casing of the payment terminal (POS). As an alternative, this tag is glued in somewhere inside the casing of the payment terminal (POS).

In this embodiment, the merchant has a Smartphone type communications terminal. This terminal comprises a module for verifying authenticity that takes the form of an application installed on the Smartphone. The application is initialized in order to contain, in a secured storage space of the communications terminal, the serial numbers of the merchant's payment terminals. This phase of initialization is implemented either by the merchant himself or by the supplier of terminals during the initialization of the terminal for the merchant.

The method implemented is the same as the one described here above. However, the step of comparison is adapted to the encrypted nature of the identification data (AuthD). Thus, in addition to the comparison proper, this step comprises:

a step for decrypting the response delivering a decrypted response;

a step of comparison of the decrypted response with the serial numbers registered within the terminal.

The step of decryption can be implemented by the communications terminal itself: this means assuming that it possesses the cryptographic equipment needed for this decryption. Such a possibility is advantageous because the communications terminal then works in autonomy. The step of decryption can be implemented by a server of the supplier or manufacturer of the payment terminals. Such a possibility is advantageous because the communications terminal does not comprise any cryptographic equipment.

These embodiments are adapted to the Smartphone type communications terminals but also to the recharging cradles or to other payment terminals. They have the advantage of securing the transmission and reception of data, which is important to counter scanning attempts prior to the replacement of the terminals by fraudulent individuals. In addition, as soon as a terminal is detected as missing or fraudulent by this method, the identification number of the purloined terminal is transmitted to a central server which can then disseminate this number in order to withdraw the purloined terminal from the list of authorized terminals to be authenticated with bank servers or servers of payment service suppliers.

5.3. Description of a Second Complementary Embodiment

In this second embodiment, the piece of authentication data (AuthD) comprises at least one component variable in time (this is for example an OTP or "one-time password" type piece of data). This data is computed both by the device for verifying authenticity and by the authenticity module of the payment terminal (POS).

As for the payment terminal (POS), in this embodiment at least two possibilities are offered:

an integration, into the casing, of a semi-active tag capable of carrying out the computational processing of the password when it is required by another payment terminal (POS).

an integration of the function within the payment terminal (POS) itself in a common processor or a processor dedicated to this function, by means of secured memory zones at its disposal, so that the payment terminal (POS) can respond (as if it were a passive tag) to the request made to it.

The device for verifying authenticity for its part has means for computing this piece of variable data according to arrangements similar to those implemented by the payment terminal (POS).

Besides, this second embodiment can be combined with the first embodiment. This means for example that the device for verifying authenticity furthermore possibly comprises the means needed to implement the decryption as indicated in the first embodiment, when these means are necessary.

In one embodiment, the procedure for generating this component variable in time is the following:
-a- the obtaining of a reference time by the device for verifying authenticity (DVAuth);
-b- the optional concatenation, with this reference time, of a piece of identification data (AuthD) of the device for verifying authenticity (DVAuth);
-c- optional encryption (either of the data coming from the step -a- or from the data coming from the step -b-);
-d- the insertion, into the request for obtaining the identification data (AuthD) (either of the data coming from the step -a- or of the data coming from the step -b- or of the data coming from the step -c-).

These steps can also entirely or partly be implemented by a remote server to which the verification terminal is connected. This further increases the security of the proposed method. Besides, it is not obligatorily necessary to introduce this piece of data into the request. To further increase security, the data can be transmitted by a server to which the payment terminal must be connected. For the payment terminal (POS) which must transmit a response to this request, the procedure is as follows:
-a- the optional decryption of the content of the request depending on the cryptographic hardware at the disposal of the payment terminal (POS) (either a processor of this terminal or the cryptographic tag);
-b- the obtaining of the reference time (either from the encrypted data from -a- or directly from the piece of data presented in the request or from the server);
-c- the computation of a component variable in time as a function of this reference time, so that it can be compared with the component variable in time computed on the authenticity verification terminal side;
-d- the transmission, in the form of a response signal, of this component variable in time, to the device for verifying authenticity (possibly encrypted and possibly concatenated with an identifier such as the serial number).

The steps that follow and precede this procedure are identical or similar to those already described in the other embodiments. As an alternative, rather than transmitting this piece of data to the device for verifying authenticity, the payment terminal (POS) displays it on one of its screens (the payment terminal (POS) is preliminarily shifted into a mode known as a verification mode). This data is also displayed on the verification terminal and the user can visually compare them. If these two pieces of data are identical, then the user can deduce therefrom that the terminal is authentic. This alternative embodiment (display of the variable piece of data on the screen) is implemented when the proposed method is executed by a processor of the payment terminal (POS) (and not by a tag).

These embodiments are particularly well suited in the case of fraud or sophisticated attempts at fraud in which the fraudulent individual takes care to make preliminary recordings of radio signals conveyed within the shopping area and then analyze these recordings to isolate the request transmitted by the authenticity verifying terminal and the response transmitted by the payment terminal (POS). They are also well suited to the case where the fraudulent individual, informed of the presence of a terminal that is carrying out the present technique, succeeds in making several request/response attempts with a communications terminal in his possession. With the proposed embodiment, this fraudulent individual will not be able to obtain the pair formed by the piece of variable data and the series number of the apparatus. He therefore cannot manufacture a counterfeit terminal that escapes this countermeasure.

5.4. Other Characteristics and Advantages

Figure 3:
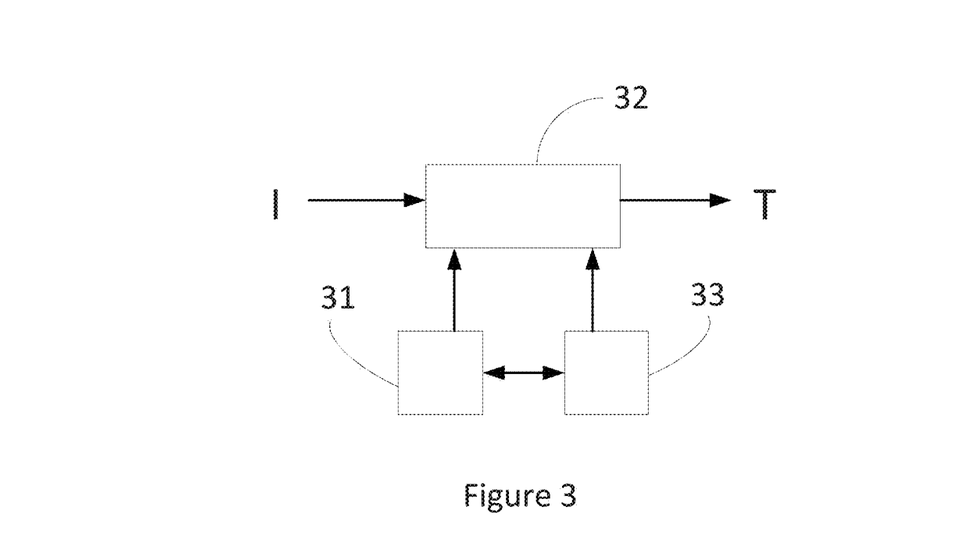
FIG. 3 describes a device for verifying authenticity.

Referring to FIG. 3, we describe a device for checking authenticity comprising means for executing the method described here above.

For example, the device comprises a memory 31 constituted by a buffer memory, a processing unit 32 equipped for example with a microprocessor, and driven by the computer program 33 implementing the method for verifying authenticity.

At initialization, the code instructions of the computer program 33 are for example loaded into a memory and then executed by the processor of the processing unit 32. The processing unit 32 inputs for example a piece of data representing a payment terminal identifier. The microprocessor of the processing unit 32 implements the steps of the method for verifying authenticity described here above according to the instructions of the computer program 33 to transmit a request for obtaining a piece of information on identification.

To this end the device comprises a buffer memory 31, means of contactless data transmission and, possibly, an encryption processor and, possibly, communications means such as network communication modules.

These means can take the form of a special processor implemented within the device, said processor being a secured processor. According to one particular embodiment, this device implements a special application which is in charge of the performance of transactions, this application being for example provided by the manufacturer of the processor in question in order to enable the use of said processor. To this end, the processor comprises unique means of identification. These unique means of identification make it possible to be sure of the authenticity of the processor. These unique means of identification can for example be used in conjunction with the means for transmitting data to the authentication server in order to make sure that the request of authentication is transmitted by a terminal that is authorized to make checks of authenticity of payment terminals.

Besides, the device furthermore comprises means for comparing an identifier provided, from a plurality of payment terminal identifiers. These means also take the form of communications interfaces enabling the exchange of data on communications networks, means of interrogation and means for updating databases. The device also comprises means for issuing an assertion of authenticity of the payment terminal (the assertion of authenticity can for example be a piece of binary data). These means can comprise a display screen, a sound alarm and modules for interfacing with existing means in order to inform the merchant of the authenticity or non-authenticity of the payment terminals in his possession. The assertion of authenticity can for example be a piece of binary data that may or may not be activated by the means previously presented according to the embodiment of the terminal.

Figure 4:
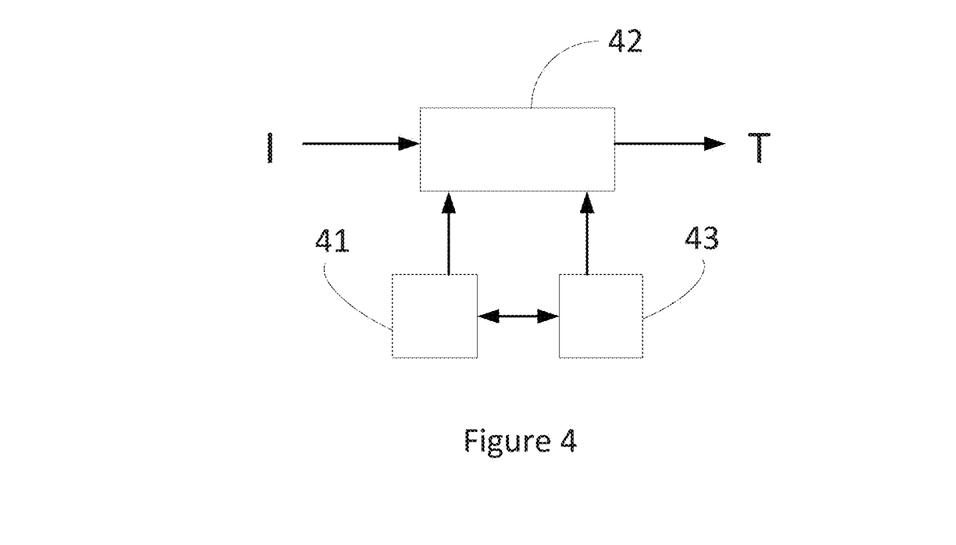
FIG. 4 describes a payment terminal integrating an element for verifying authenticity.

Referring to FIG. 4, we describe a payment terminal comprising means for executing the method described here above.

For example, the payment terminal comprises a memory 41 constituted by a buffer memory, a processing unit 42 equipped for example with a microprocessor, and driven by the computer program 43 implementing the steps needed to carry out the payment functions.

At initialization, the code instructions of the computer program 43 are for example loaded into a memory and then executed by the processor of the processing unit 42. The processing unit 42 inputs for example a bank data or data representing a purchase. The microprocessor of the processing unit 42 implements the steps of the method for verifying authenticity according to the instructions of the computer program 43 to make payment and declare the success or failure of this payment.

To this end the device comprises a buffer memory 41, means of contactless data transmission and, possibly, an encryption processor and, possibly, communications means such as network communication modules.

According to the an embodiment of the present disclosure, such a payment terminal furthermore comprises means of near-field transmission of a piece of identification data. These means can be driven by the processor of the processing unit 42 according to the computer program 43 when the terminal does not comprise any dedicated contactless tag. Complementarily, such a payment terminal can comprise a specific antenna integrated into the casing of the payment terminal (for example molded into the plastic of this terminal) this antenna being intended to come into contact with a contactless reception/transmission module, for example soldered to a printed circuit board of the payment terminal. The link between this module and the antenna can for example be a link by gluing. In such an embodiment, when the shell of the terminal is dismantled, the end of the antenna is pulled away from the contactless module. In particular, a "weak" point is introduced through the exit point of the antenna (at the plastic material of the casing) so that in the event of dismantling, it is this point that is broken.

This means that it is not possible to reassemble the terminal and ensure that the antenna is rebuilt. Thus, in the event of theft or dismantling of the payment terminal, the terminal will no longer be capable of being authenticated by the authenticity verification terminal.

An exemplary embodiment of the present disclosure does not pose the problems of the prior art. More particularly, an exemplary embodiment provides a simple solution to the above-mentioned problems and issues of the prior art.

Although the present disclosure has been described with reference to one or more examples, workers skilled in the art will recognize that changes may be made in form and detail without departing from the scope of the disclosure and/or the appended claims.

The invention claimed is:

1. A method for verifying an authenticity of a payment terminal, implemented by a device for verifying authenticity, wherein the method comprises:
   transmitting, to the payment terminal, a request for obtaining a piece of identification data, which identifies the particular payment terminal, by using a contactless communications interface;
   receiving a response, through said contactless communications interface and coming from the payment terminal, to said request for obtaining a piece of identification data, wherein the response comprises the piece of identification data that identifies the particular payment terminal and comprises a one-time use password generated by the payment terminal according to a predetermined method of generation;
   comparing a field of said response with at least one piece of pre-recorded identification data;
   when the field comprises a piece of identification data identical to said at least one piece of pre-recorded identification data, issuing an assertion of authenticity of said payment terminal; and
   when the field comprises a piece of identification data different from said at least one piece of pre-recorded identification data, issuing a piece of information on absence of authentication of the payment terminal.

2. The method for verifying an authenticity of a payment terminal according to claim 1, wherein said contactless communications interface is an NFC interface.

3. The method for verifying according to claim 1, wherein when no response is received, said transmitting a request for obtaining a piece of identification data s implemented iteratively for a predetermined period before the issuing of a piece of information on absence of authentication of the payment terminal.

4. The method for verifying an authenticity of a payment terminal according to claim 1, wherein the comparing comprises:
   decrypting the response delivering a decrypted response;
   obtaining, within a data structure, at least one piece of identification data associated with said payment terminal, delivering said at least one piece of pre-recorded identification data.

5. The method for verifying an authenticity of a payment terminal according to claim 1, wherein said piece of identification data furthermore comprises at least one component variable in time and this component variable in time is derived from a reference time computed according to said terminal for verifying authenticity.

6. The method for verifying an authenticity of a payment terminal according to claim 1, wherein the method comprises:
   obtaining a reference time;
   computing a component that is variable in time as a function of this reference time.

7. A device for verifying an authenticity of a payment terminal, wherein the device comprises:
   means for transmitting, to the payment terminal, a request for obtaining a piece of identification data, which identifies the particular payment terminal itself, by using a contactless communications interface;
   means for receiving, through said contactless communications interface, and coming from the payment terminal, a response to said request for obtaining a piece of identification data, wherein the response comprises the piece of identification data that identifies the particular payment terminal and comprises a one-time use password generated by the payment terminal according to a predetermined method of generation;
   means for comparing a field of said response with at least one piece of pre-recorded identification data;
   means for issuing an assertion of authenticity of said payment terminal; and
   means for issuing a piece of information on absence of authentication of the payment terminal.

8. A payment terminal comprising:
   a display device,
   an information entry keypad,
   means for reading data coming from at least one payment device;
   means for connecting to at least one communications network;
   means for storing, within a specific memory zone, at least one piece of data representing an identification of said payment terminal, which identifies the particular payment terminal itself and comprises a one-time use password generated by the payment terminal according to a predetermined method of generation;
   means for receiving a request for obtaining said piece of data representing the identification of said particular payment terminal; and means for transmitting said piece of data representing the identification of said particular payment terminal.

9. The payment terminal according to claim 8, further comprising:
a device for verifying an authenticity of the payment terminal, which comprises:
means for transmitting, to the payment terminal, the request for obtaining said piece of identification data by using a contactless communications interface;
means for receiving, through said contactless communications interface, and coming from the payment terminal, a response to said request for obtaining a piece of identification data;
means for comparing a field of said response with at least one piece of pre-recorded identification data;
means for issuing an assertion of authenticity of said payment terminal; and
means for issuing a piece of information on absence of authentication of the payment terminal.

10. A non-transmissible computer-readable medium comprising a computer program product comprising program code instructions for execution of a method for verifying an authenticity of a payment terminal, implemented by a device for verifying authenticity, when the instructions are executed on a computer, wherein the method comprises:
transmitting, to the payment terminal, a request for obtaining a piece of identification data, which identifies the particular payment terminal itself, by using a contactless communications interface;
receiving a response, through said contactless communications interface and coming from the payment terminal, to said request for obtaining a piece of identification data, wherein the response comprises the piece of identification data that identifies the particular payment terminal and comprises a one-time use password generated by the payment terminal according to a predetermined method of generation;
comparing a field of said response with at least one piece of pre-recorded identification data;
when the field comprises a piece of identification data identical to said at least one piece of pre-recorded identification data, issuing an assertion of authenticity of said payment terminal; and
when the field comprises a piece of identification data different from said at least one piece of pre-recorded identification data, issuing a piece of information on absence of authentication of the payment terminal.

11. The device for verifying an authenticity of a payment terminal according to claim 7, wherein said contactless communications interface is an NFC interface.

12. The device for verifying according to claim 7, wherein said means for transmitting a request for obtaining a piece of identification data are configured to transmit said request iteratively for a predetermined period before the issuing of a piece of information on absence of authentication of the payment terminal, wherein when no response is received by said means for receiving.

13. The device for verifying an authenticity of a payment terminal according to claim 7, wherein said means for comparing comprises:
means for decrypting the response delivering a decrypted response;
means for obtaining, within a data structure, at least one piece of identification data associated with said payment terminal, delivering said at least one piece of pre-recorded identification data.

14. The device for verifying an authenticity of a payment terminal according to claim 7, wherein:
the request comprises a reference time obtained by the device; and
said piece of identification data furthermore comprises at least one component variable in time and this component variable in time is derived from the reference time.

15. The device for verifying an authenticity of a payment terminal according to claim 7, wherein the device comprises:
means for obtaining a reference time;
means for computing a component that is variable in time as a function of this reference time.

16. The device for verifying an authenticity of a payment terminal according to claim 7, wherein the a piece of identification data represents a piece of data representing a serial number of the payment terminal.

* * * * *

UNITED STATES PATENT AND TRADEMARK OFFICE
CERTIFICATE OF CORRECTION

Page 1 of 1

PATENT NO.         : 9,672,505 B2
APPLICATION NO.    : 14/675049
DATED              : June 6, 2017
INVENTOR(S)        : David Naccache et al.

It is certified that error appears in the above-identified patent and that said Letters Patent is hereby corrected as shown below:

In the Claims

Claim 3: Column 12, Line 8, "obtaining a piece of identification data s implemented itera-" should read --obtaining a piece of identification data is implemented itera- --

Signed and Sealed this
Sixteenth Day of April, 2019

Andrei Iancu
*Director of the United States Patent and Trademark Office*